US010544909B2

(12) United States Patent
Ramones et al.

(10) Patent No.: US 10,544,909 B2
(45) Date of Patent: Jan. 28, 2020

(54) LIGHT TRANSMISSION DEVICE FOR NETWORKING DEVICE

(71) Applicant: Netgear, Inc., San Jose, CA (US)

(72) Inventors: John Kui Yin Ramones, San Ramon, CA (US); Christopher Vincent Fonzo, Carlsbad, CA (US)

(73) Assignee: Netgear, Inc., San Jose, CA (US)

( * ) Notice: Subject to any disclaimer, the term of this patent is extended or adjusted under 35 U.S.C. 154(b) by 0 days.

(21) Appl. No.: 15/730,020

(22) Filed: Oct. 11, 2017

(65) Prior Publication Data

US 2019/0107256 A1   Apr. 11, 2019

(51) Int. Cl.
*F21K 9/23* (2016.01)
*F21K 9/237* (2016.01)
*F21V 23/00* (2015.01)
*F21V 33/00* (2006.01)
*F21K 9/238* (2016.01)

(52) U.S. Cl.
CPC .............. *F21K 9/237* (2016.08); *F21K 9/238* (2016.08); *F21V 23/004* (2013.01); *F21V 33/0048* (2013.01)

(58) Field of Classification Search
CPC . F21K 9/237; F21K 9/238; F21K 9/00; F21K 9/20; F21K 9/23; F21K 99/00; F21S 2/00; F21V 19/042; F21V 19/045; F21V 23/004
See application file for complete search history.

(56) References Cited

U.S. PATENT DOCUMENTS

2012/0106138 A1\* 5/2012 Mandy ................ B66B 11/0233
                                                           362/147
2016/0273741 A1\* 9/2016 Jung ................... F21V 19/0055

\* cited by examiner

*Primary Examiner* — Curtis B Odom
(74) *Attorney, Agent, or Firm* — Boyle Fredrickson S.C.

(57) ABSTRACT

A light transmission device includes body that extends between a generally planer lower rim that is configured to collect light from a light source, and an upper rim that is configured to emit the light. The upper rim may be elliptical and emit the light in a generally uninterrupted elliptical light emission pattern, even if the light is transmitted to the lower rim in a linear or other non-elliptical pattern. The light transmission device may be located within a wireless networking device with wireless antennas located between the lower and upper rims of the body.

20 Claims, 6 Drawing Sheets

LIGHT TRANSMISSION DEVICE FOR NETWORKING DEVICE

BACKGROUND

1. Field of the Invention

The invention relates generally to a light transmission device, and more particularly to a light transmission device disposed within a wireless networking device housing and configured to collect light emitted from an internal light source and transmit the collected light outwardly from the housing in a light emission pattern that differs from the configuration of the internal light source. The invention additionally relates to a wireless networking device having such a light transmission device.

2. Discussion of the Related Art

Various small electronic devices often include functional indicator lights and/or esthetic lighting components. However, as such devices, for example wireless network devices, have become smaller, it has become increasingly difficult to place LED light sources directly adjacent the device housing. For example, positioning LEDs on a printed circuit board in close proximity to the device housing may require that the LEDs' printed circuit board be separated from the device's main circuit board. Such designs may lack sufficient space to include multiple boards or may be cost prohibitive. Alternatively, to avoid adverse interference with wireless signals, it may be desirable to locate LED light sources at a position that is remote from the device housing. Accordingly, in such situations, it is necessary to provide a pathway for the light to travel from its internal LED light source to the position on the device housing where the light will be emitted. Some devices have attempted to overcome these challenge through the use of a light pipe, which transmits light from a source through a clear plastic or glass formed fiber optic transmission line that terminates at or near the light emitting portion of the device housing. However, prior light pipe applications are primarily focused on the transmission of light over distances and do not accommodate for the light to be diffused or redirected into alternative emission patterns. Furthermore, prior light pipes do not provide for the light pipe to simultaneously provide structural benefits, such as internal component mounting surfaces, in addition to providing a light transmission pathway.

Thus, there is need for a light transmission device configured to collect light emitted from an internal light source and to transmit the collected light outwardly from a device housing in an emission pattern that differs from the configuration of the internal light source.

There is additionally a need for a light transmission device configured to both provide a light transmission pathway and provide internal component mounting surfaces for internal components of the electronic device.

SUMMARY OF THE INVENTION

One or more of the above-identified needs are met by a light transmission device including a body having an upper rim, a lower rim, and a wall extending between the upper rim and the lower rim. The lower rim of bifurcated body is configured to collect light from a light source, and the upper rim of the bifurcated body configured to emit the light.

The body may be formed of a transparent material or generally transparent material such that the wall is configured to facilitate the transmission of light therein from the lower rim to the upper rim.

The body may be generally elliptically frustoconical in shape.

The body may also include a void circumferentially defined within the wall, where the void configured to retain a portion of a wireless antenna mounting frame within the void.

The body may be a bifurcated body that includes first and second mutually engaged portions. The first and second portions of the bifurcated body may each include one or more outward projections that are configured to cooperate and maintain the first and second portion of the bifurcated body in direct contact such that the upper and lower rims are uninterrupted The light source may be positioned adjacent to the lower rim within the wireless networking device is a generally linear array of printed circuit board mounted LEDs.

In accordance with another aspect of the invention, a wireless network device is provided that has a light pipe having one or more of the characteristics described above.

In accordance with another aspect of the invention, a method of transmitting light in a wireless networking device is provided including the steps of: generating a light at one or more LEDs affixed to a printed circuit board that is located within a housing and transmitting the light to a lower rim of a light transmission device in a first, non-elliptical pattern, where the device has a generally elliptically frustoconical body; transmitting the light through the body of the light transmission device; and emitting the light at the generally elliptical upper rim of the light transmission device in an at least generally uninterrupted elliptical pattern.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings, in which like reference numerals represent like parts throughout, and in which.

DETAILED DESCRIPTION OF THE PREFERRED EMBODIMENTS

A wide variety of light transmission devices could be constructed in accordance with the invention as defined by the claims. Hence, while exemplary embodiments of the invention will now be described with reference to a light transmission device for use with a wireless networking device, it should be understood that the invention is in no way so limited.

Figure 1:
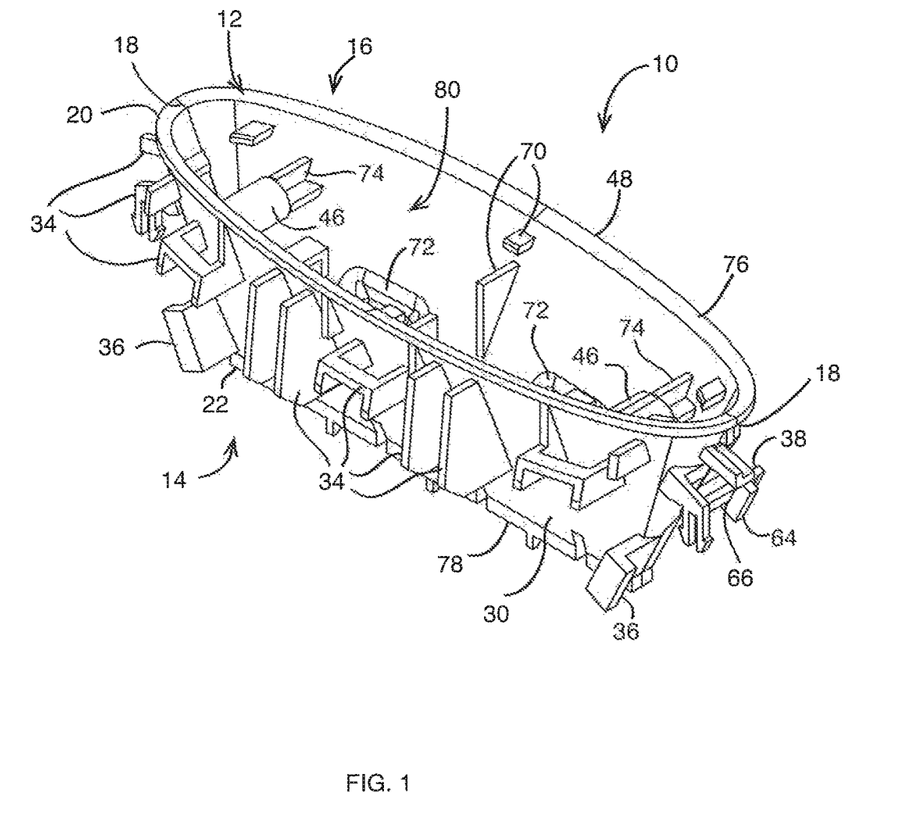
FIG. 1 is a perspective view of a light transmission device according to one embodiment of the present invention with a first portion engaging a second portion, viewed from above, in front of, and the right side of the light transmission device.

FIG. 1 is a perspective view of a light transmission device 10, e.g., light pipe, in accordance with one embodiment of the present invention. The light transmission device 10 includes a body 12 formed of a first portion 14 and a second portion 16 joined at opposing vertical joints 18. The resulting body 12 has a generally elliptical frustoconical shape as shown in FIG. 1. The body 12 may be made from a plastic material such as an injection-molded plastic that is transparent or at least generally transparent, such by being translucent or opaque as to allow for light to travel through the material that forms the body 12.

Each of the first and second portions 14, 16 now will be described in further detail below in turn.

Figure 2:
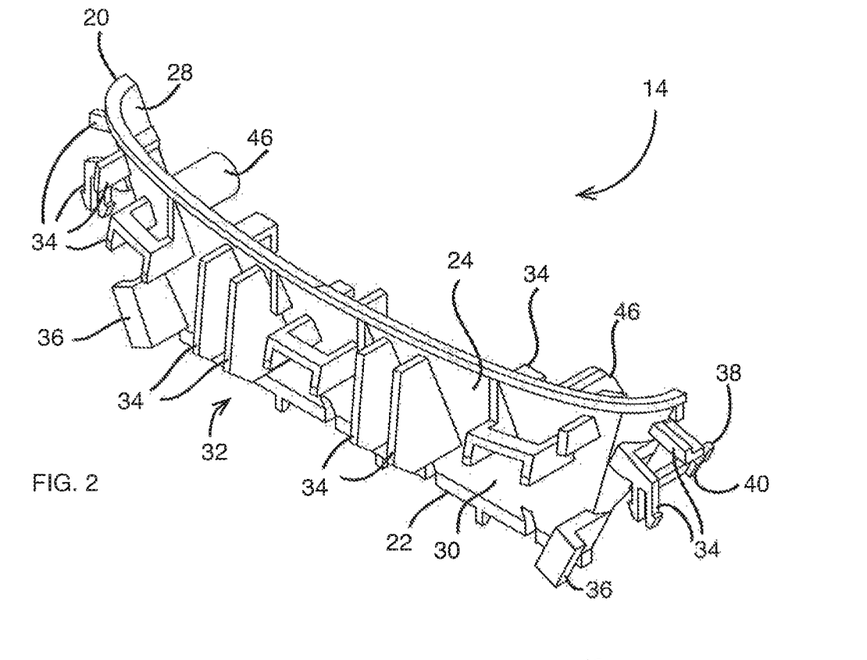
FIG. 2 is a perspective view of the first portion of the light transmission device shown in FIG. 1, viewed from above, in front of, and the right side of the first portion.
Figure 3:
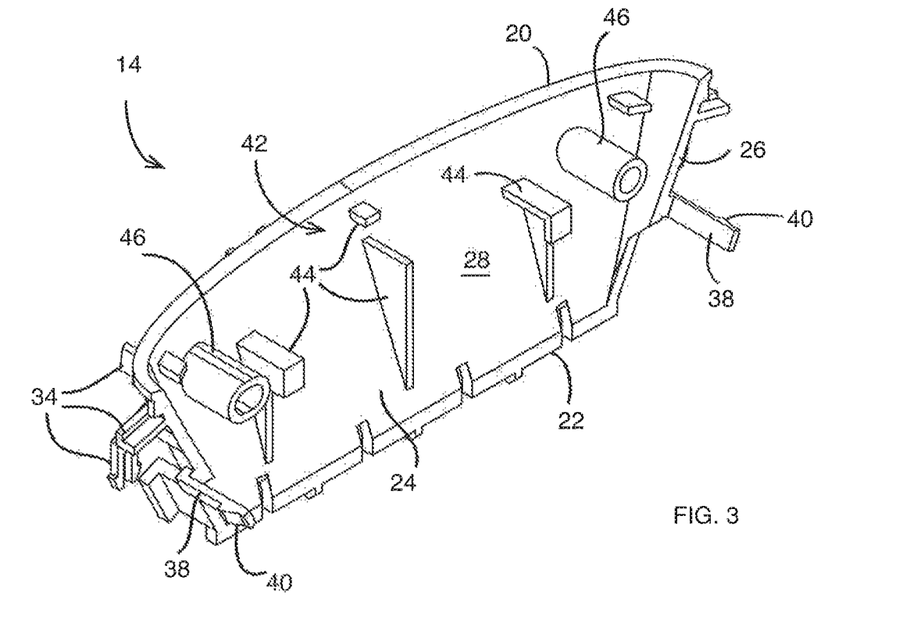
FIG. 3 is a perspective view of the first portion of the light transmission device shown in FIG. 1, viewed from above, behind, and the right side of the first portion.

Turning now to FIGS. 2 and 3, and initially FIG. 2, the first portion 14 of the body 12 is shown including an upper edge 20, a lower edge 22 and a wall 24 extending between the upper and lower edges 20, 22. The wall 24 has a thickness 26 defined between an inner wall surface 28 and the outer wall surface 30. Still referring to FIG. 2, the outer wall surface 30 may include a series of outwardly projecting tabs 32. One or more of the outwardly projecting tabs 32 may be position retention tabs 34 which are configured to extend outwardly from the first portion 14 of the body 12 and to engage the surrounding housing of the wireless networking device housing, as described in further detail below. That is to say that the position retention tabs 34 maintain the first portion 14 in its desired position when integrated into an assembled electronic device.

Still referring to FIG. 2, one or more of the outwardly projecting tabs 32 may also be component retaining tabs 36, which are configured to engage and retain components of the electrical device, such as an antenna, in their desired position within the interior of the assembled wireless networking device, as described in further detail below.

Still referring to FIG. 2, one or more of the outwardly projecting tabs 32 may also be e securing tabs 38 which are configured to extend inwardly from the first portion 14 of the body 12 to secure the second portion 16 of the body 12 to the first and second portions 14, 16 as shown in FIG. 1. As shown in FIG. 2, the securing tabs 38 may be positioned at opposing lateral edges of the first portion 14 and extend inwardly from the lateral edges of the outer wall surface 24 towards the second portion 16. Furthermore, each of the securing tabs 38, as shown in FIGS. 2 and 3, may be elongated flexible tabs that include a locking protrusion 40 that is configured to engage a corresponding tab of the second portion 16 and resist separation of the bifurcated body 12 once assembled.

Turning now to FIG. 3, the inner wall surface 28 of the first portion 14 is shown, including a series of inwardly projecting tabs 42. One or more of the inwardly projecting tabs 42 may also be component retaining tabs 44, which are configured to engage and retain components of the electrical device in their desired position within the interior of the assembled body 12, as described in further detail below in conjunction with FIG. 7. Still referring to FIG. 3, one or more of the inwardly projecting tabs 42 may also be a securing tab 46 which extend inwardly from the inner wall surface 28 of the first portion 14 and which are configured to secure the first portion 16 of the body to the second portion 16 of the body 12 in their assembled configuration as shown in FIG. 1. As shown in FIG. 3, the securing tabs 46 may be positioned at generally opposing lateral sides of the inner wall surface 28 of the first portion 14 and extend inwardly in the form of a female connector that is configured to receive and engage the male connector counterpart of the second portion 16, as will be described in further detail below.

Figure 4:
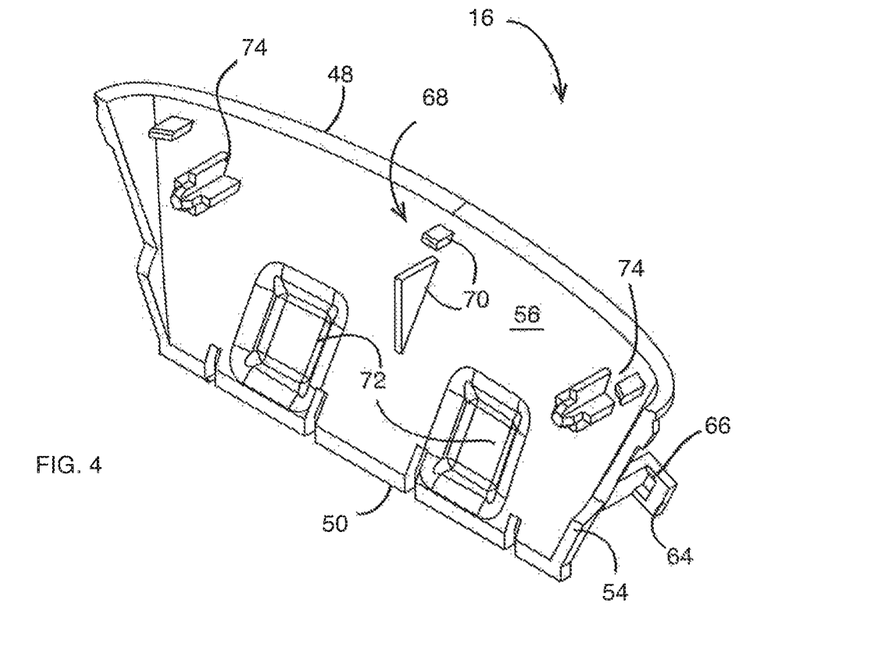
FIG. 4 is a perspective view of the second portion of the light transmission device shown in FIG. 1, viewed from above, in front of, and the right side of the second portion.
Figure 5:
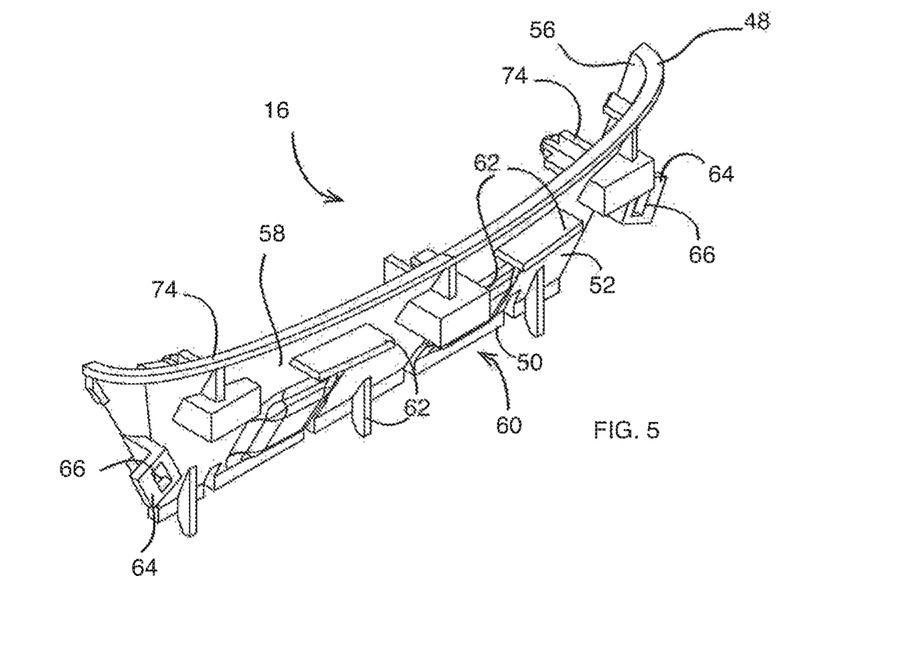
FIG. 5 is a perspective view of the second portion of the light transmission device shown in FIG. 1, viewed from above, behind, and the right side of the second portion.

Turning now to FIGS. 4 and 5, the second portion 16 of the body 12 of the light pipe 10 is shown and described in substantial similar terms as the first portion 14 of the body 12 that was described above. Turning initially to FIG. 5, the second portion 16 of the body 12 is shown including an with an upper edge 48, a lower edge 50 and a wall 52 extending between the upper and lower edges 48, 50. The wall 52 has a thickness 54 defined between an inner wall surface 56 and the outer wall surface 58. Still referring to FIG. 5, the outer wall surface 58 may include a series of outwardly projecting tabs 60. One or more of the outwardly projecting tabs 60 may be position retention tabs 62 which extend outwardly from the second portion 16 of the body 12 and which are configured to engage the surrounding housing of the wireless networking device, as described in further detail below.

Still referring to FIG. 5, one or more of the outwardly projecting tabs 60 may also be one or more securing tabs 64 which extend from the second portion 16 and which are configured to secure the first and second portions 14, 16 of the body 12 in their assembled configuration as shown in FIG. 1. As shown in FIG. 5, the securing tabs 64 may be positioned at opposing lateral edges of the second portion 16 and extend inwardly from the lateral edges of the outer wall surface 58. Furthermore, each of the securing tabs 64, as shown in FIGS. 4 and 5 may be an elongated tab that includes an aperture 66 configured to receive the locking protrusion 40 of the corresponding securing tab 34 of the first portion 14 therein.

Turning now to FIG. 4, the inner wall surface 56 of the second portion 16 is shown as including a series of tabs 68. One or more of the tabs 68 may also be a component retaining tab 70 which is configured to engage and retain one or more components of the electrical device in their desired position within the interior of the assembled body 12, as described in further detail below in conjunction with FIG. 7. As shown in FIG. 4, the component retaining tabs 70 may extend inwardly from the inner wall surface 56 of the second portion 16, while other component retention tabs 70 may extend outwardly from the inner wall surface 56 in the form of a protrusion or recess 72

Still referring to FIG. 4, one or more of the inwardly projecting tabs 68 may also be a securing tab 74 that extends inwardly from the inner wall surface 56 of the second portion 16 and that is configured to engage the first portion 14 of the body 12 so as to secure the first and second portions 14, 16 in their assembled configuration as shown in FIG. 1. The securing tabs 74 may be positioned at generally opposing lateral sides of the inner wall surface 56 of the second portion 16 and may extend inwardly in the form of a male connector that is configured to receive and engage the female connector counterpart of the first portion 14, as will be described in further detail below.

Returning again to FIG. 1, the first and second portions 14, 16 of the body 12 are shown in an assembled configuration in which the male formed securing tabs 74 of the second portion 16 have been received within the female securing tabs 46 of the first portion 14. Additionally in FIG. 1, extending from their respective outer wall surfaces 30, 58, the securing tabs 38 of the first portion 14 engage the corresponding securing tab 64 of the second portion 16, with each locking protrusion 40 engaging the corresponding aperture 66. In this configuration the first and second portions 14, 16 of the body 12 are joined at vertical joints 18 to form an uninterrupted bifurcated body 12. Furthermore, the upper edge 20 of the first portion 14 is contiguous with the upper edge 48 of the second portion 16, resulting in an unbroken upper rim 76 of the body 12. While the upper rim 76 of this embodiment is generally elliptical, alternative shapes or configurations are considered well within the scope of the present invention. Similarly, the bottom edge 22 of the first portion 14 is contiguous with the bottom edge 48 of the second portion 16, resulting in an unbroken lower rim 78 of the body 12. While the lower rim 78 of this embodiment is generally planer, alternative shapes or configurations are considered well within the scope of the present invention.

Still referring to FIG. 1, the general elliptical frustoconical shape of the body 12, when assembled will allow for LED light to be received at the lower rim 78 of the body 12, travel through the walls 24, 52 of the first and second portions 14, 16 respectively, and be emitted from the upper rim 76 of the body 12. In this general configuration, the LED light source may be positioned adjacent the lower rim 78 of the body 12, and thereby be removed at a distance from the upper rim 76 of the body 12. Such a configuration may be preferable as to separate the LEDs from wireless antennas that are positioned at or near the upper rim 76 of the body 12 as to minimize electrical interference therebetween. The general shape of the body 12 thus defines a void 80 within the interior of the body 12 which houses one or more wireless antennas that are located above and oriented away from the LED light sources positioned at the lower rim 78, as will be described below.

Figure 6:
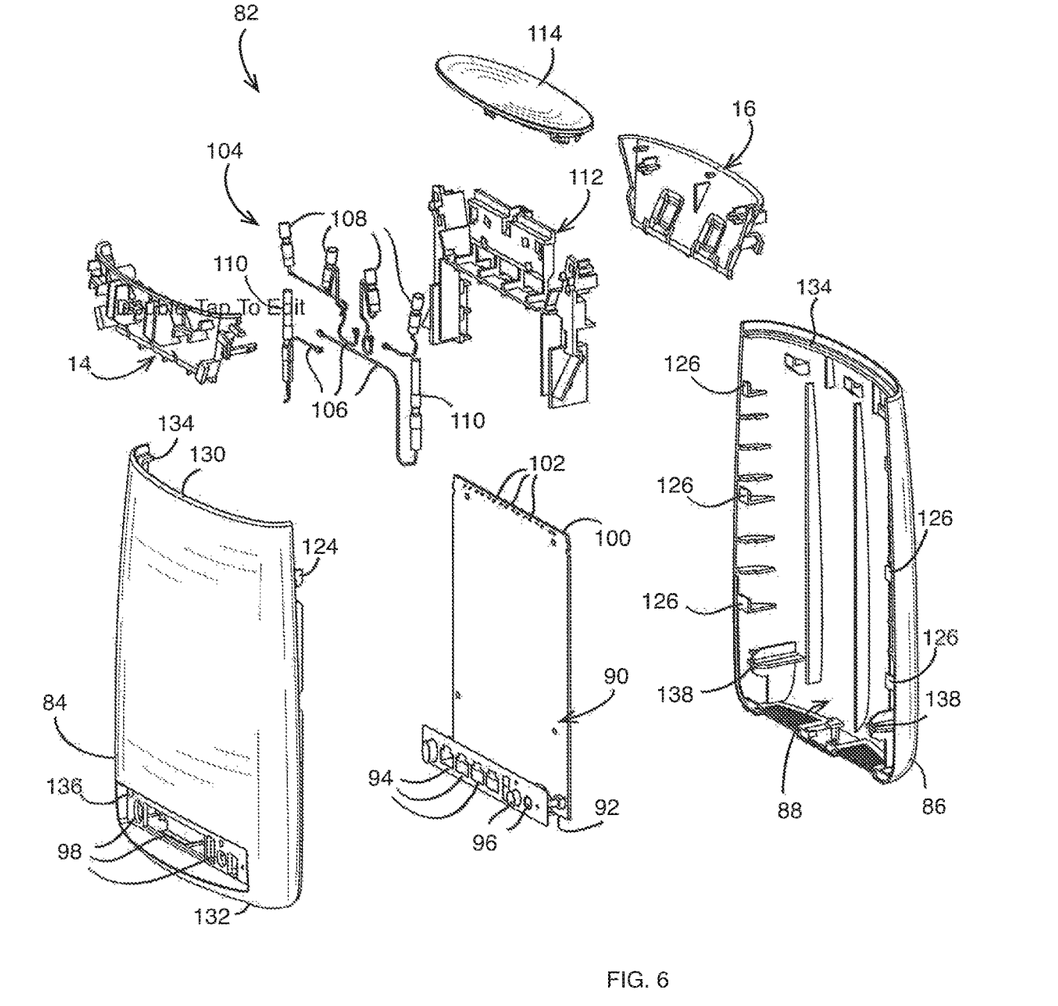
FIG. 6 is an exploded view of a wireless network device according to one embodiment of the present invention and including the light transmission device shown in FIG. 1.

Turning now to FIG. 6, an exploded view of an electronic device 82, namely a wireless networking device is shown including the light transmission device 10 described above. The illustrated device 82 is an extender for use with a wireless router. However, it should be understood that the present invention is in no way limited to use with extenders or even with wireless networking devices, and that other electronic devices are considered well within the scope of the present invention.

Figure 7:
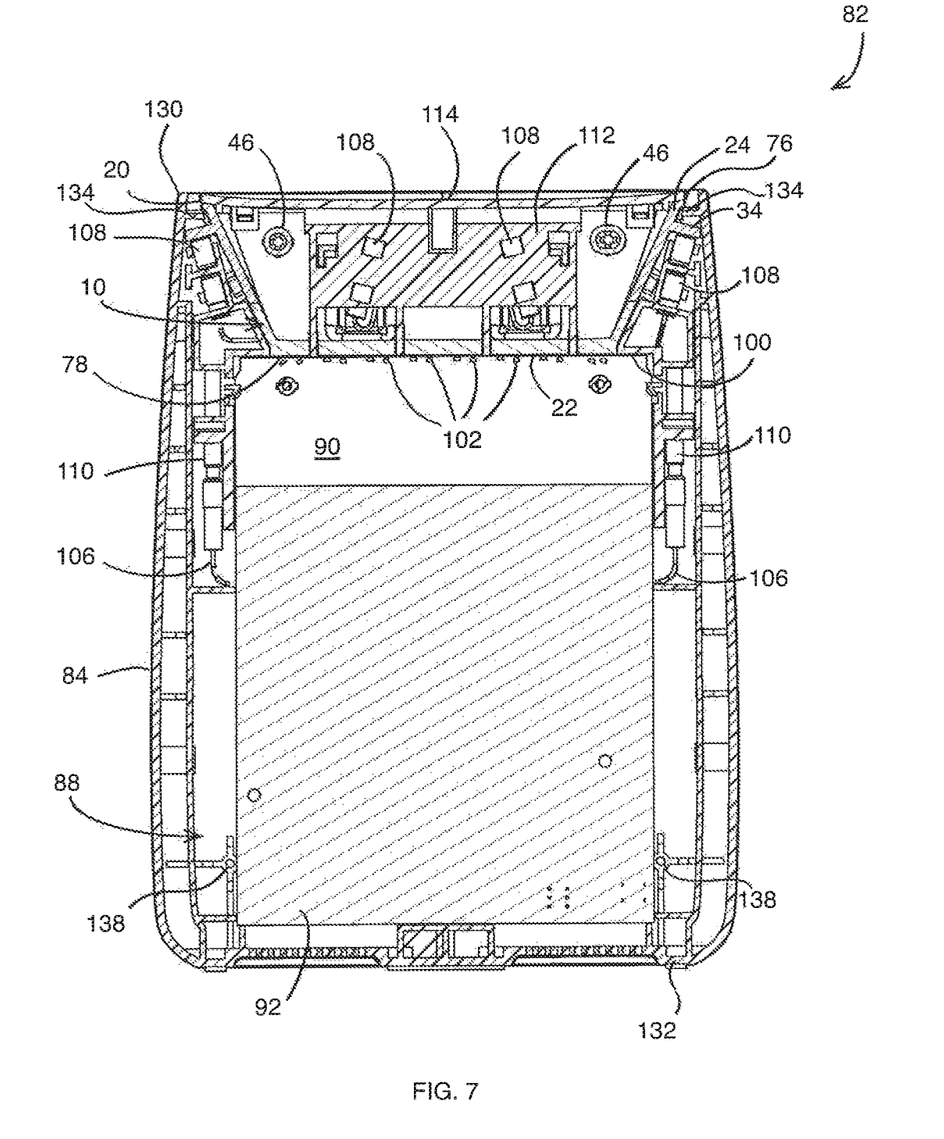
FIG. 7 is a cross sectional view of the wireless network device shown in FIG. 6.
Figure 8:
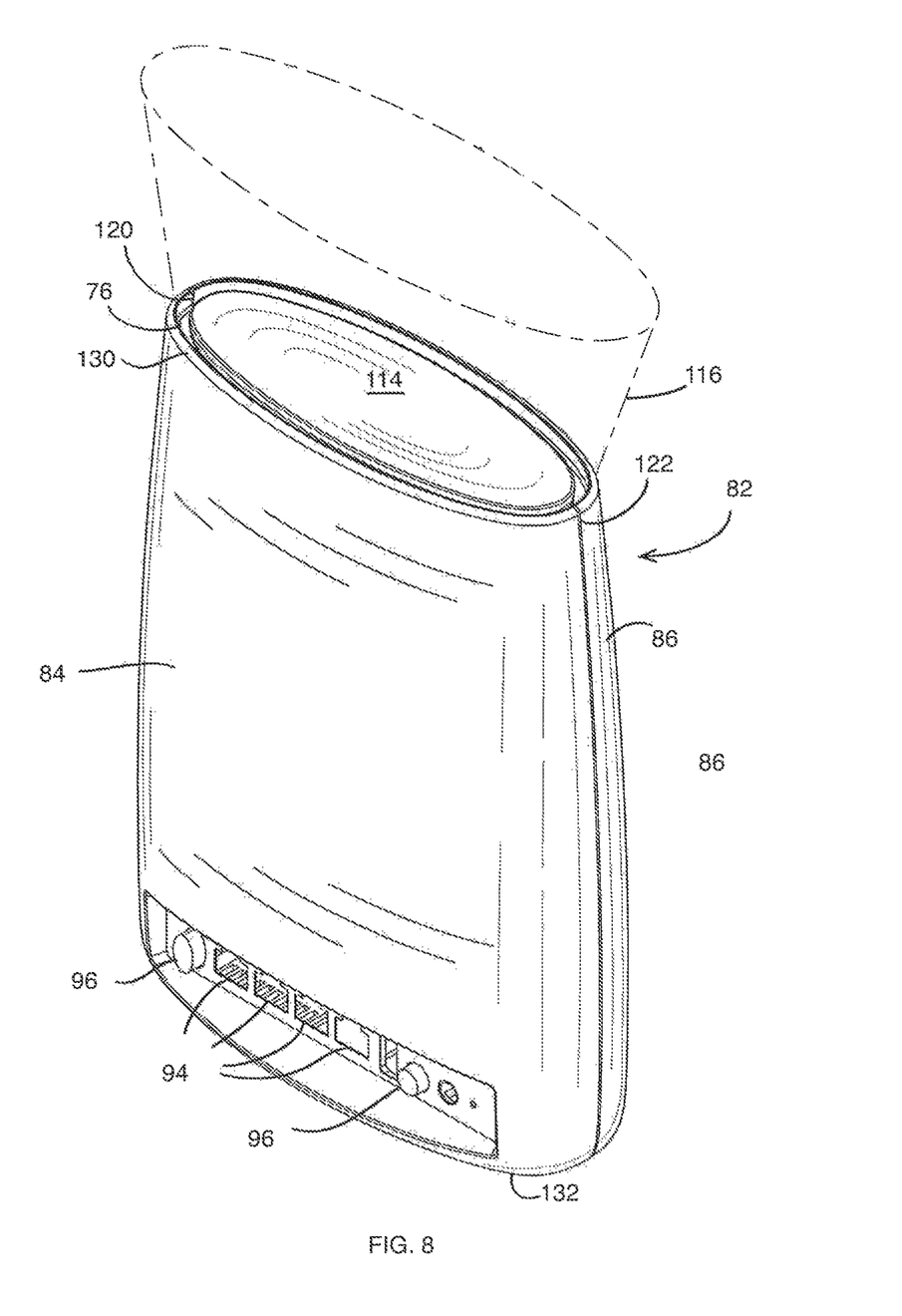
FIG. 8 is a perspective view of the wireless network device shown in FIG. 6 viewed from above, in front of, and the right side of the wireless network device, showing light emitting from the light transmission device.

The wireless networking device 82 as shown in FIGS. 6-8 includes a housing 83 having a first housing portion 84 and an opposing second housing portion 86, which are connected to one another at seams 120, 122 define a central cavity 88. This connection is assisted by mating tabs 124 and 126 on the housing portions 84 and 86, respectively, and fasteners (not shown), such as screws, that extend through apertures 136 in the first housing portion 84 and are secured within internal receiving channels 138 within the second housing portion 86, as best seen in FIG. 6. The thus-assembled housing 83 has an upper end 130 and a lower end 132. An internal lip 134 is positioned just beneath the upper end 130.

A printed circuit board (PCB) 90 is positioned within the central cavity 88 in the housing 83. PCB has first and second (lower and upper) opposed ends 92 and 100. One or more ports 94 or user inputs 96 extend outwardly from the lower end portion of the printed circuit hoard 90 through apertures 98 in the first housing portion 84. The opposing second end 100 of the printed circuit board 90 may support one or more LEDs 102. The LEDs 102 may be a fixed color LED or a variable color LED, and their light emission may be constant or interrupted as to function as a status indicator for the electrical device 82. The LEDs 102 are located adjacent, i.e., just below, the lower rim 78 of the body 12 of the light transmission device 10, as was described above.

The electronic device 82 may further include a series of wireless antennas 104 that are in electrical connection with the printed circuit board 90 via connectors 106. As shown in FIG. 6, in one embodiment of the present invention, the series of wireless antennas 104 may include four 5G wireless antennas 108, two of which are generally positioned within the void 80 formed in the body 12 of the light transmission device 10 and two of which are generally positioned at the opposing lateral edges of the light transmission device 10. The series of wireless antennas 104 may also include two 2G wireless antennas 110 that are generally positioned at the opposing lateral edges of the electronics device 82.

As shown in FIG. 6, the series of wireless antennas 104 may be retained within a carrier or mounting frame 112 that is configured to both retain the series of wireless antennas 104 and cooperate with the light transmission device 10. A cover 1114 is located at the top of the electronic device 82, forming the upper surface of the housing 83, and is preferably configured to be received within the upper rim 76 of the body 12 of the light transmission device 10 in an overlying relationship with the rim 76 and the lip 134. In this configuration, the upper rim 76 is visible and will allow the light collected at the lower rim 78 to pass through the light transmission device 10 and be emitted from upper rim 76 that is positioned at the upper surface of the electronic device 82. Moreover, as previously indicated, this configuration provides for the LEDs 102 to be positioned at a sufficient distance from the series of wireless antennas 104 as to reduce electrical interference therewith while simultaneously emitting LED generated light.

Turning now to FIG. 7, the electronic device 82 is shown in cross section, with the series of LEDs 102 positioned at the upper edge 100 of the printed circuit board 90. The series of LEDs 102 are further located adjacent the lower rim 78 of the body 12 of the light transmission device 10, as previously described. This configuration is further beneficial in that it allows LEDs 102 to be affixed to a single side of the printed circuit board 90 in a generally linear arrangement, and to emit light into the generally planer lower rim 78 of the body 12 of the light transmission device 10. Light propagating through the light transmission device 10 light travels through the curved walls 24, 52 of the first and second housing portions 14, 16 respectively, and may be emitted from the generally elliptical upper rim 76 of the body 12. The generally elliptical frustoconical shape of the body 12 of the light transmission device 10 allows for the transformation and/or diffusion of the light from a generally linear LED array to a continuous or uninterrupted elliptical shape at the upper rim 76. Accordingly, the light transmission device 10 of the present embodiment does not require the series of LEDs 102 to be positioned or arranged in the orientation of the upper rim 78, i.e., elliptical, but rather provides an efficient and cost-effective manner for transmitting and diffusing a single source or liner array of light into a geometrically different emission pattern. The light emission pattern 116, as previously described is generally shown extending upwardly from the electrical device 82 in FIG. 8.

In use, as was generally described above, a power source (not shown) will provide the printed circuit board 90 with a current via the connection 94. In turn, the printed circuit board 90 will generate a signal that may be transmitted by one or more of the series of wireless antennas 104 disposed within the upper portion of the central cavity 88 defined by the housing 84, 86 of the electrical device 82. Light generated by the LEDs is emitted from the upper surface of the electrical device 82 in a non-linear pattern. This light emission pattern 116 is of generally the same non-linear shape as the upper rim 76 of the body 12, which is generally elliptical in this embodiment. Operation of the LEDs 102 does not unacceptably interfere with antenna operation because the LEDs are disposed well below the series of wireless antennas 104.

More specifically, the light emitted from the one or more LEDs 102 impinges on the planer lower rim 78 in a non-elliptical, generally linear pattern, and then travels through the generally elliptical frustoconical shape of the body 12, which shape the pattern from the received generally linear pattern to a generally elliptical pattern. The light then is emitted from the upper rim 76 in an at least generally uninterrupted and at least generally elliptical pattern such as the one seen in FIG. 8.

It is contemplated that an alternative embodiment may incorporate any of the features of the previous embodiment described above.

Many other changes and modifications could be made to the invention without departing from the spirit thereof.

We claim:

1. A light transmission device for use in a wireless networking device, comprising:
   the wireless networking device having a housing;
   the light transmission device disposed within the housing;
   the light transmission device comprising a body having an upper rim, a lower rim and a wall extending between the upper rim and the lower rim, wherein the body is formed of a material that is at least generally transparent to visible light;
   wherein an exterior surface of the lower rim of the body is configured to collect visible light from an LED light source disposed within the housing; and
   wherein the upper rim of the body extends through the housing and is configured to emit the light.

2. The light transmission device of claim 1, wherein the wall is configured to facilitate the transmission of light therein from the lower rim to the upper rim.

3. The light transmission device of claim 1, wherein the body is generally elliptically frustoconical in shape.

4. The light transmission device of claim 3, wherein the lower rim is generally planer.

5. The light transmission device of claim 4, wherein the upper rim is generally elliptical in shape.

6. The light transmission device of claim 1, wherein a void that is circumferentially defined within the wall, the void configured to retain a portion of a mounting frame therein.

7. The light transmission device as claim 6, wherein the mounting frame is configured to support one or more wireless antennas thereof.

8. The light transmission device of claim 1, wherein the body of the light transmission device is a segmented body.

9. The light transmission device of claim 8, wherein the segmented body is a bifurcated body having a first portion and second portion that each include one or more outward projections configured to cooperate with one another and maintain the first portion and second portion of the bifurcated body in direct contact with one another.

10. The light transmission device of claim 9, wherein the upper rim and lower rim are uninterrupted when the first portion and second portion of the bifurcated body are in direct contact with one another.

11. A wireless networking device, comprising:
    a housing;
    a printed circuit board disposed within a housing;
    the LEDs in electrical communication with the printed circuit board, the LEDs being configured to generate visible light and being arranged in a first pattern;
    a light transmission device disposed within the housing, the light transmission device comprising:
    a body having an upper rim, a lower rim, and a wall extending between the upper rim and the lower rim,
    wherein the lower rim of the body is disposed adjacent the one or more LEDs and is configured to collect the light generated therefrom and to transmit the light to the upper rim, and
    wherein the upper rim of the body extends through the housing and is configured to emit the light in second, non-linear pattern that is geometrically distinct from the first pattern.

12. The wireless networking device of claim 11, wherein the body of the light transmission device comprises a bifurcated body having a first portion and second portion that each include one or more outward projections configured to cooperate and maintain the first portion and second portion of the bifurcated body in direct contact with one another.

13. The wireless networking device of claim 12, wherein the upper rim and lower rim are uninterrupted when the first portion and second portion of the bifurcated body are in direct contact with one another.

14. The wireless networking device of claim 11, wherein the body is generally elliptically frustoconical in shape, having a generally linear lower rim and a generally elliptical upper rim.

15. The wireless networking device of claim 11, wherein the first pattern is generally linear formed by placing the LEDs in a generally linear array.

16. The wireless networking device of claim 11, further comprising a mounting frame which is disposed at least in part in a void in the body of the light transmission device, the wireless antennas being mounted on the mounting frame.

17. The wireless networking device of claim 11, further comprising one or more wireless antennas in electrical communication with the printed circuit board positioned between the lower rim and the upper rim of the light transmission device.

18. A method of transmitting light from a wireless networking device, comprising the steps of:
    providing one or more LEDs affixed to a printed circuit board disposed within a housing
    generating visible light at the one or more LEDs;
    transmitting the light in a non-elliptical pattern to a generally planer lower rim of a light transmission device having a generally elliptically frustoconical body extending between the generally planer lower rim and a generally elliptical upper rim;
transmitting the light through the body of the light transmission device from the lower rim to the upper rim; and
emitting the light from the generally elliptical upper rim of the light transmission device in an at least generally elliptical pattern.

19. The method of claim 18 wherein, the generating step comprises generating the light at a height lower than a height of one or more wireless antennas of the wireless networking device.

20. The method of claim 18, wherein the transmitting step comprises transmitting the light in an at least generally linear pattern.

* * * * *